United States Patent [19]

Deshpande et al.

[11] Patent Number: 5,673,413
[45] Date of Patent: Sep. 30, 1997

[54] METHOD AND APPARATUS FOR COHERENCY REPORTING IN A MULTIPROCESSING SYSTEM

[75] Inventors: Sanjay Raghunath Deshpande, Austin; John Michael Kaiser, Cedar Park, both of Tex.

[73] Assignee: International Business Machines Corporation, Armonk, N.Y.

[21] Appl. No.: 573,092

[22] Filed: Dec. 15, 1995

[51] Int. Cl.⁶ ........................................................... G06F 12/16
[52] U.S. Cl. ............................................. 395/468; 395/287
[58] Field of Search ........................................ 395/468, 471, 395/472, 473, 287, 800, 180

[56] References Cited

U.S. PATENT DOCUMENTS

| | | | |
|---|---|---|---|
| 5,297,269 | 3/1994 | Donaldson et al. | 395/472 |
| 5,406,504 | 4/1995 | Denisco et al. | 364/580 |
| 5,530,933 | 6/1996 | Frink et al. | 395/468 |
| 5,548,797 | 8/1996 | Arimilli et al. | 395/880 |
| 5,557,769 | 9/1996 | Bailey et al. | 395/473 |

*Primary Examiner*—Gopal C. Ray
*Attorney, Agent, or Firm*—Anthony V. S. England

[57] ABSTRACT

An information processing system includes a plurality of bus devices coupled to at least one storage device via a bus. A first device (the "requestor") on a bus issues a request to obtain data and coherency information and monitors for the coherency information during a designated coherency response interval. A second device (the "respondant") sends a first signal during the designated coherency response interval indicating that the coherency information will be returned during a second interval, and sends a second signal providing the coherency information to the requestor during the second interval.

22 Claims, 7 Drawing Sheets

|      | T1          | T2        | T3        | T4          | T5            | T6      |
|------|-------------|-----------|-----------|-------------|---------------|---------|
| TT   | < Read >    |           | < Rerun > | < Read >    |               |         |
| Addr | < Addr Tag >|           |           | < Addr Tag >|               |         |
| A Resp|            | < Rerun > |           |             | < Coher. Info >|        |
| Data |             |           |           |             |               | < Data >|
| DTag |             |           | < Tag >   |             |               | < Tag > |

FIG. 4

|       | T1          | T2           | T3             |
|-------|-------------|--------------|----------------|
| TT    | < Read >    |              |                |
| Addr  | < Addr Tag >|              |                |
| A Resp|             | < RemStat >  |                |
| Data  |             |              | < data >       |
| DTag  |             |              | < tag >        |
| DCache|             |              | < Coher. Info >|

FIG. 5

METHOD AND APPARATUS FOR COHERENCY REPORTING IN A MULTIPROCESSING SYSTEM

CROSS REFERENCE TO RELATED APPLICATIONS

This application for patent is related to the following applications for patent filed Oct. 4, 1994:

SYSTEM AND METHOD FOR COMMUNICATING BETWEEN DEVICES, Ser. No. 08/298,873 continued as Ser. No. 08/704,035, filed Aug. 28, 1996;

DUAL LATENCY STATUS AND COHERENCY REPORTING FOR A MULTIPROCESSING SYSTEM, Ser. No. 08/316,980; and SYSTEM AND METHOD FOR DETERMINING SOURCE OF DATA IN A SYSTEM WITH INTERVENING CACHES, Ser. No. 08/317,256.

Each of such cross-referenced applications are hereby incorporated by reference into this application as though fully set forth herein. The present application and each of such cross-referenced applications are assigned to the same assignee.

TECHNICAL FIELD OF THE INVENTION

The present invention relates in general to data processing systems and, in particular, to a system and method for providing coherency information within a multiprocessor system.

BACKGROUND OF THE INVENTION

In a multiprocessor system having a plurality of bus devices coupled to a memory system via a shared bus, a bus device will issue an operation, such as a read operation, requesting a particular portion of data stored within the memory system. In systems employing "snoopy" bus devices, a bus device coupled to the shared bus monitors the operation to determine whether the operation relates to data contained within that bus device's cache. This is often referred to as "coherency checking". Such coherency checking includes insuring that the most recent and valid version of requested data is sent to the requesting device, regardless of whether the memory system or one of the bus devices currently holds a copy of the most recent version.

When a bus device sends a bus request over the shared bus, several types of reports may be sent back to the requesting device. One piece of information sent back to the requesting bus device reports on the coherency of the requested data, i.e., who owns a valid version of the requested data. A certain response window (the "Address Response window"), as described in related application DUAL LATENCY STATUS AND COHERENCY REPORTING FOR A MULTIPROCESSING SYSTEM, Ser. No. 08/316,980 (HQ9-94-033) may be used for coherency reporting. This window, also referred to as a coherency response window, is placed a configurable number of clock cycles after the address and request code, allowing for a longer latency, due to the cache directory look-ups required within each of the other bus devices.

When coherence information cannot be promptly obtained so as to be returned within the allowed Address Response window, the window for the response needs to be extended. This need arises, for example, in a non-uniform memory access ("NUMA") type system or a switched memory directory type system because in such a system the coherency information is not always available on the local snoopy bus and the read request must be forwarded to another bus or memory directory system. (In NUMA architecture the processing system has only local bus memory. In memory directory architecture the processing system has only global memory not belonging to any local bus.) A protocol for a certain extension of the coherency response window is described in related application SYSTEM AND METHOD FOR COMMUNICATING BETWEEN DEVICES, Ser. No. 08/298,873 (HQ9-94-017).

SUMMARY OF THE INVENTION

It is an object of the present invention to improve the performance of coherency reporting when read data is sourced from a bus not local to a requesting processor, as commonly occurs in NUMA or memory directory based systems.

It is also an objective to improve the performance of such read operations without adding hardware signals to the protocol previously defined.

In attainment of the these objectives, in response to a read request for data on a non-local source a certain coherency response is returned if the read request has been accepted (i.e., no retry response has been issued in response to the read operation), the requested data is obtained from the non-local source, and when the data is delivered to the requestor a certain signal indicates coherency status of the data.

In another aspect of an embodiment of the invention, the coherency status is indicated to be either "shared" or "exclusive".

It is an advantage that the invention enables extending a coherency response window without a requesting device having to wait for a ReRun operation and then re-issue a read operation. This significantly reduces the latency of read operations for non-local data in NUMA or memory directory type systems. Since read operations are a substantial portion of all bus operations this may significantly increase system performance.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings which illustrate one or more embodiments of the invention.

FIG. 4 illustrates a ReRun operation which provides a means for extending a coherency information response interval.

FIG. 5 illustrates a RemStat operation which provides a means for extending a coherency information response interval.

DETAILED DESCRIPTION OF A PREFERRED EMBODIMENT OF THE INVENTION

To clearly point out novel features of the present invention, the following discussion omits or only briefly describes conventional features of information processing systems which are apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
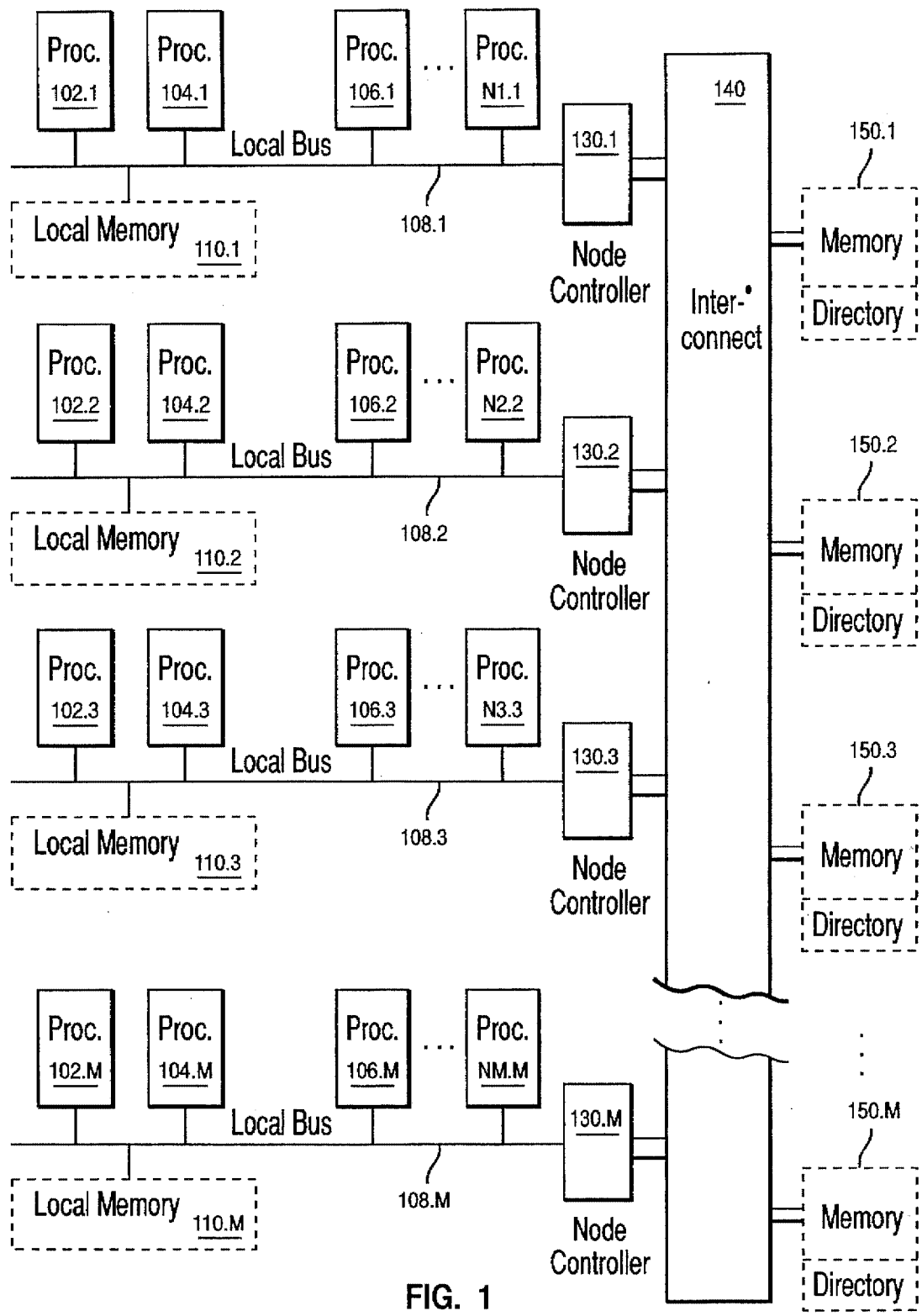
FIG. 1 is a system block diagram showing multiple shared local buses.

Referring now to FIG. 1, a data processing system which advantageously embodies the present invention will be described. Multiprocessor system 100 includes a number of local system buses 108.1, 108.2, etc., with a local system bus such as bus 108.1 having a number of processing units 102.1, 104.1, 106.1, etc. and a processor node controller (or "bus adaptor") 130.1 operatively connected thereto. (Where a number of similar, numbered elements are referred to or shown herein, such as system buses 108.1, 108.2, etc., these elements may be referred to collectively or singly without the suffix, such as, for example, "system buses 108" or "system bus 108".) A processor unit 102, 104, 106, etc, may include a processor and a cache storage device, but may be referred to herein simply as a "processor". A node controller 130 includes a directory for the system memory 110 on the local bus if there is local memory. A system bus 108 is operably coupled to an interconnect 140 through a node controller 130 which couples the bus 108 to other buses 108 in the NUMA architecture and to memory elements 150 with their included directories in the memory directory architecture.

Figure 2:
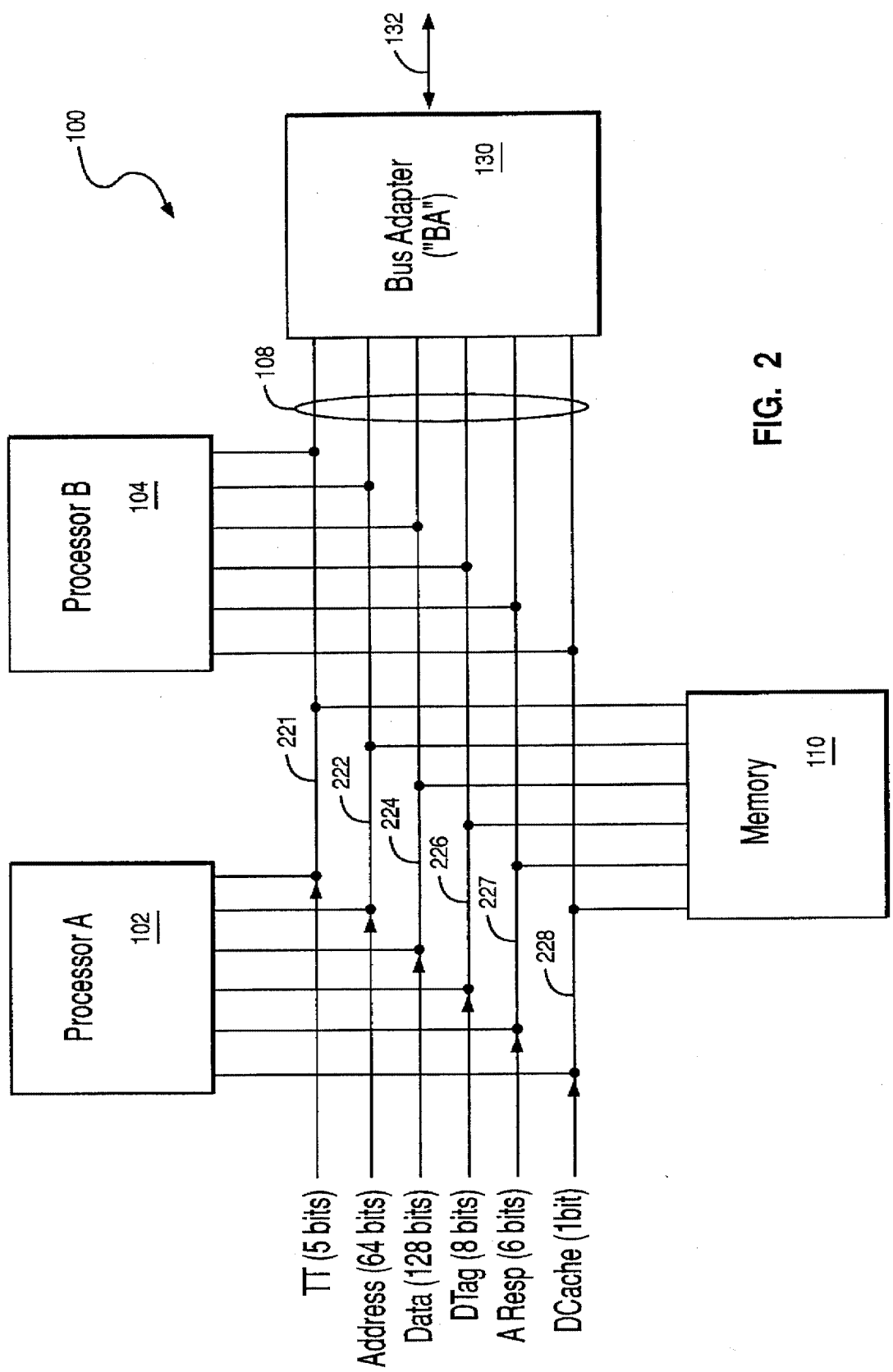
FIG. 2 is a block diagram of a local bus in the system.

Referring now to FIG. 2, a local system bus 108, is shown operatively connected to a number of processing units 102, 104, 106, etc. through processing unit n. Also connected to the system bus 108 is system memory 110. In this illustrative embodiment, system bus 108 includes, among other things, a 5-bit transfer type ("TT") bus 221, a 64-bit address bus 222, a 128-bit data bus 224, and 8-bit data tag ("DTag") bus 226, a 6-bit address response ("AResp") bus 227, and a 1-bit cache data ("DCache") bus 228. System elements 102–110 operate under the control of node controller 130, which communicates with the elements 102–110 connected to the system bus 108 by point to point lines (not shown). A node controller 130 is coupled at 132 to other buses and devices (see FIG. 1). Thus, referring to FIG. 1, a processor 102.1 coupled locally to bus 108.1 may communicate through node controller 130.1 to devices beyond the local bus 108.1, such as processor 102.2 coupled to its local bus 108.2, memory 110.3 coupled to its local bus 108.3, and memory 150.1 coupled to interconnect 140, for example.

Requests and grants of bus 108 access are all controlled by node controller 130. One of the bus devices, such as processor 102, may request to enable an operation onto bus 108 from node controller 130 via a point to point connection (not shown). Upon receiving a bus grant from controller 130, processor 102 will then enable an address onto bus 108, including a transaction tag which identifies the processor 102 as the requesting device.

In order to maximize the number of bus attachments and bus frequency, and yet allow attachment to the bus 108 directly with CMOS logic devices, the various status and coherency responses from the bus devices are driven unidirectionally from each bus participant to a common collection point, such as in node controller 130, which combines all the responses and then returns the combined responses to each requesting bus device. The node controller 130 also collects coherency information for remote memory 150 or memory 110, i.e., memory 150 or memory 110 located remote to the bus 108 of the requesting device 102. The combining logic of the node controller 130 also prioritizes the responses, since bus devices may be signalling different responses. These prioritizations are noted within the tables described herein.

Figure 3:
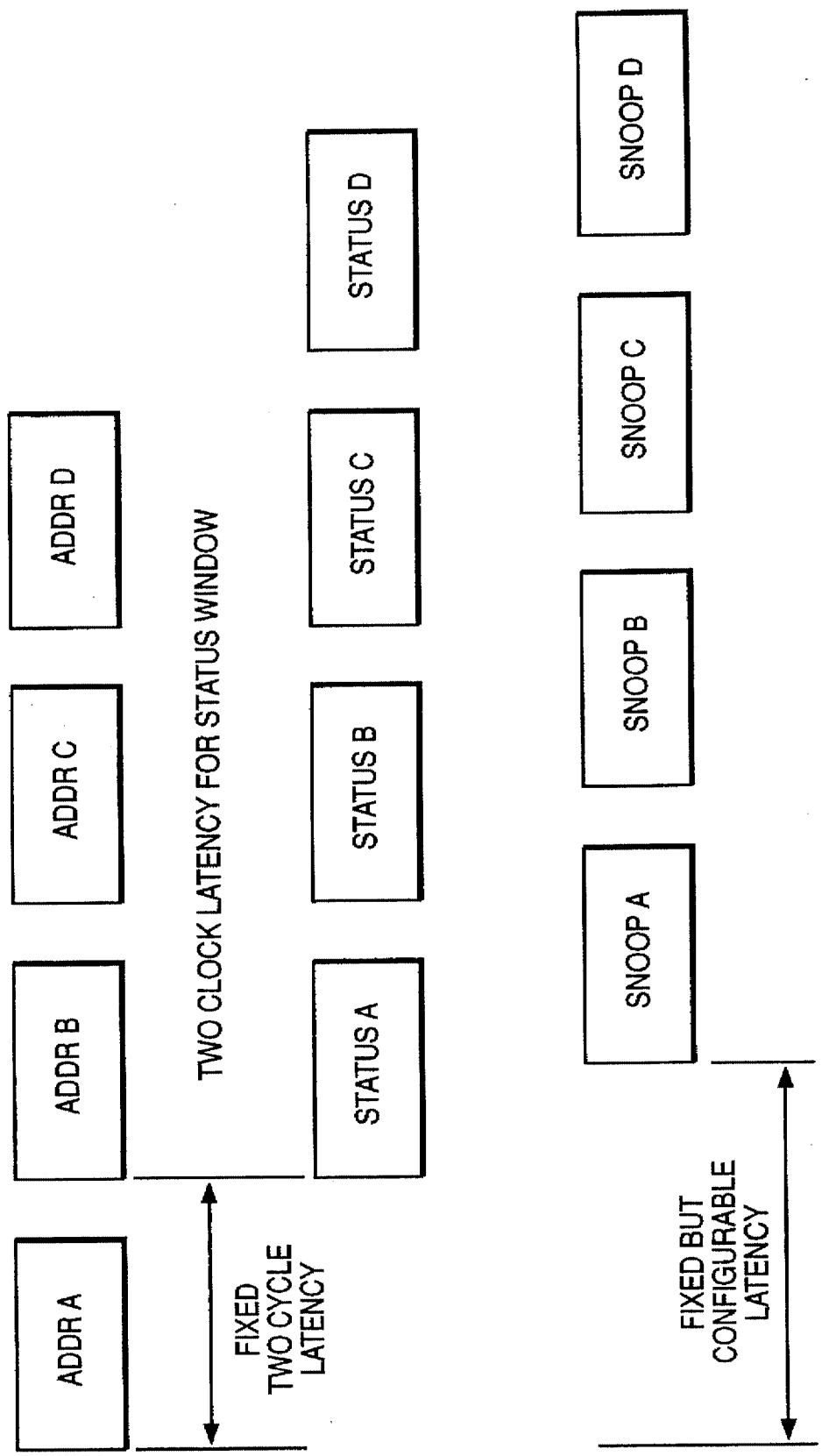
FIG. 3 generally illustrates operations using a flow control status response interval and a coherency information response interval.

Referring next to FIG. 3, address A may be enabled onto bus 108 by processor 102. A fixed time later, status information, i.e., flow control and error status, will be returned to processor 102 during Flow Control Status Response Window A (shown as "Status A"). Processor 102 may also wait for a further fixed, but configurable amount of time for coherency information, which may be returned to processor 102 from the various other bus devices in system 100 by the node controller 30 on the AResp bus 227 during Address Response Window A (shown as "Snoop A"). This coherency information, which is produced as a result of a typical snooping operation by the other bus devices, indicates to processor 102 where the most recent version of the requested data is located. For example, if processor 104 determines that it contains the requested data in a modified form, then it will inform processor 102 that it holds the most recent version of the requested data and that system memory 110 does not contain the most recent version. The placement of the Address Response window a configurable number of clock cycles after the address and request code allows for different and longer access times to perform cache directory look ups within each of the various bus devices in system 100.

Table A indicates example coherency messages as they are encoded in a preferred embodiment:

TABLE A

| Encoded Snoop (Coherency) Message | Priority | Definition |
| --- | --- | --- |
| 000 | | Reserved |
| 001 | | Reserved |
| 010 | 5 | RemStat |
| 011 | 3 | ReRun |
| 100 | 1 | Retry |
| 101 | 2 | Modified |
| 110 | 4 | Shared |
| 111 | 6 | Null or Clean (Not Modified or Shared) |

Note that the table includes a prioritization of the returned coherency messages. This prioritization may be utilized by system controller 130, which first receives the returned messages, to determine which of the received messages from various bus devices to send to processor 102. For example, if bus device 104 returns a "Modified" message, having a priority of 2 (see Table A), and bus device 106 returns a "ReRun" message having a priority of 3, then controller 130 may be implemented to send the "Modified" message coherency response.

Three of the responses shown in Table A provide a prompt resolution of coherency during a non-extended Address Response window. The Modified response is used to indicate to a requesting device, e.g., processor unit 102, that a modified cache line exists in a cache within one of the other local processor units 104, 106, etc. The Shared response indicates that the data exists in one or more such local caches, but is not modified. The Null response indicates that the data is not in a local nor a remote cache, but in a local memory.

Three of the responses shown in Table A extend the Address Response window. The Retry response is used to indicate a coherency collision and that the operation should be resent later by the requesting device. The ReRun response and the RemStat response are used when leaving the local bus.

FIGS. 4 and 5 show various signals asserted on buses included in the system bus 108 during time intervals T1, T2, etc. In both FIGS. 4 and 5, time intervals indicated are not necessarily shown to scale either as to duration or as to time between intervals.

FIG. 4 illustrates the implementation of an extended Address Response window as set up by a ReRun response. At time T1 a processor, e.g. processor 102, issues a read operation requiring coherency information, including the processor 102 asserting a read signal on the TT bus 221 and an address and a tag on the address bus 222. During the Address Response window (time interval T2), which is a certain configured time following the read request, node controller 130 asserts a ReRun signal on the AResp bus 227. The ReRun response indicates that the node controller 130 will later initiate a ReRun request, subtantially relieving the requesting device 102 from initiating further action to obtain coherency information until then. Once the coherency information has been obtained from the nonlocal source, the controller 130 directs a ReRun request to the requesting device 102 at time T3 by asserting on the DTag bus 226 the transaction tag initially established by the requesting device 102 and asserting the ReRun request on the TT bus 221. In response, the processor 102 resends the read operation at time T4, this time also asserting a certain bit (the "R bit") on the address bus 222, and the controller 130 asserts the coherency information on the AResp bus 227 during the configured Address Response window (time interval T5). When the requested data has been obtained. The transaction tag is asserted on the DTag bus 226 and the data is asserted on the data bus 224 during a read interval (time interval T6).

FIG. 5 illustrates the implementation of an extended Address Response window as set up by the signalling of a RemStat response. At time T1 a processor, e.g. processor 102, issues a read operation requiring coherency information, including the processor 102 asserting a read signal on the TT bus 221 and an address and a tag on the address bus 222. During the Address Response window (time interval T2), which is a certain configured time following the read request, node controller 130 asserts a RemStat signal on the AResp bus 227. The RemStat response indicates that the system controller 130 will later return the requested data to the requesting processor 102 together with coherency information for the data, subtantially relieving the the requesting device 102 from initiating further action to obtain the coherency information and also substantially reducing latency.

As described in related U.S. patent application SYSTEM AND METHOD FOR DETERMINING SOURCE OF DATA IN A SYSTEM WITH INTERVENING CACHES, Ser. No. 08/317,256 (HQ9-94-034), prior to the present invention the DCache bus has been used for DCache signals to indicate when a data transfer is from an intervening cache device rather than from system memory and has been driven in that circumstance by the cache device. Since the DCache signal is not asserted for such cache intervention during non-local bus read operations it is available to carry the coherence information according to the present invention.

When a processor 102 has a pending request, such as this request to read certain data, the processor 102 monitors the DTag bus each clock cycle. Once the node controller 130 has obtained the requested data and the coherency information for the data, the node controller 130 asserts transaction tag signals on the DTag bus 224 identifying the requesting device, data signals on the data bus 224, and coherence information signals on the DCache bus 228. In the preferred embodiment the tag, data and coherency information are all asserted during the same clock cycle (shown as time interval T3). During the cycle when the transaction tag is signaled (i.e., interval T3), and in response to detecting the tag on the DTag bus, the processor 102 reads both the data signals on the data bus 224 and the coherency signals on the DCache bus 228 without having to incur the additional latency associated with waiting for the ReRun operation from the node controller 130 and then initiating an additional request and waiting for an Address Response window to read the requested information.

Figure 6A:
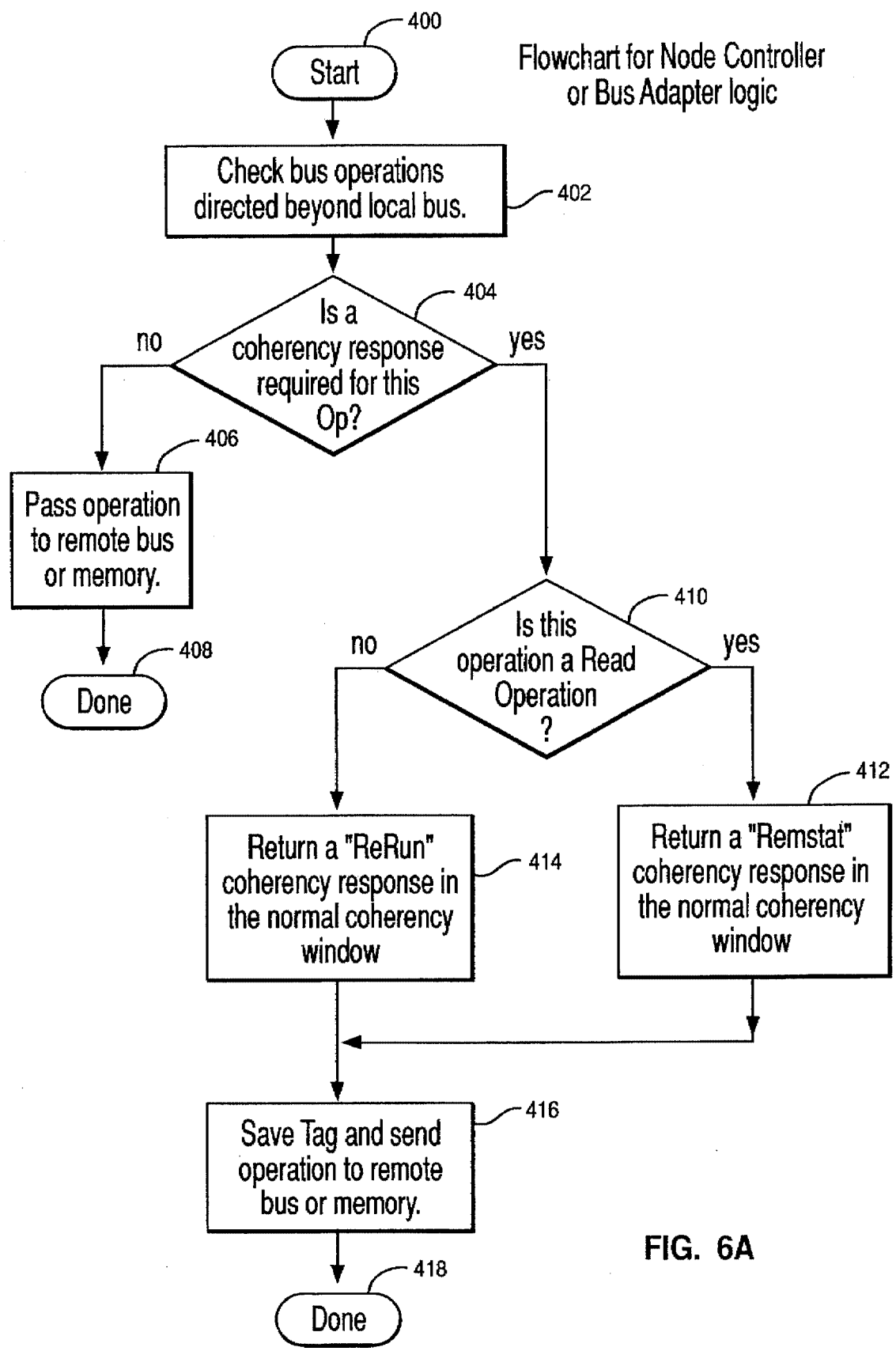
FIGS. 6a, 6b and 6c are flow charts illustrating the operations using the extended coherency information response interval.
Figure 6B:
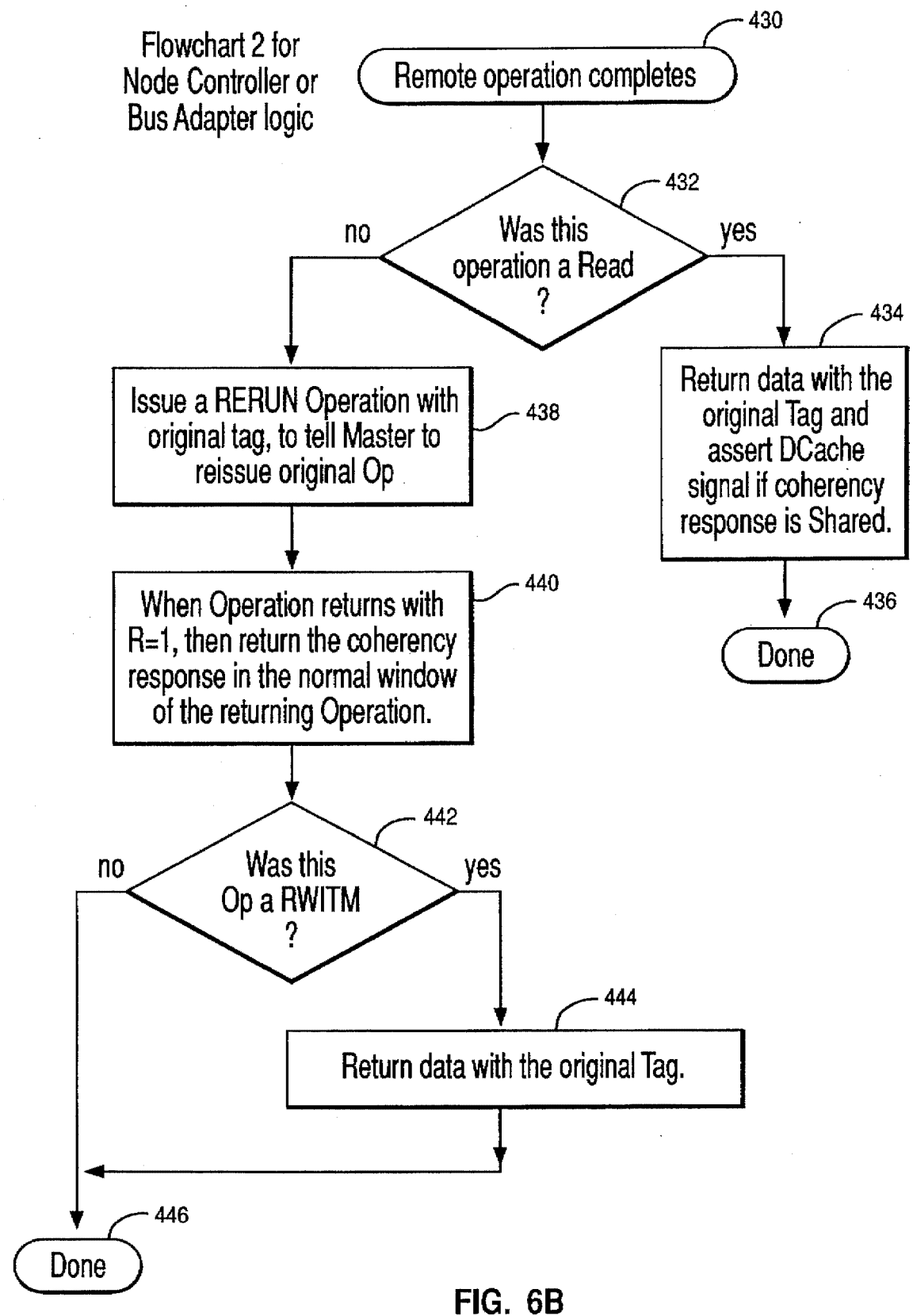

Referring now to FIGS. 6a and 6b, flow charts are shown of operations performed by the information processing system 100. More particularly, flow charts of FIGS. 6a and 6b show operations performed by a bus device such as the processor node controllers 130 of the preferred embodiment. The operations shown in FIGS. 6a and 6b may not necessarily be performed in the indicated sequence. For FIG. 6a, execution begins as shown at block 400 and proceeds to block 402 where the controller 130 analyzes those bus operations which are directed to beyond the local bus 108. For example, bus 108.1 is local to processor 102.1 so that a read operation by processor 102.1 sourcing data from memory 110.2 on bus 108.2 or from memory 150 would be a bus operation directed beyond the local bus 108.1.

Execution then continues for such bus operations to a decision block 404 where the controller 130 logic branches to block 406 if a coherency response is not required (in which case the analysis for purposes of the present invention is complete as indicated by block 408) or to block 410 if a coherency response is required.

According to the decision of block 410, the controller 130 logic branches to block 412 for read operations, or to block 418 for other operations. For read operations, the controller 130 returns to the requestor a RemStat response during the normal Address Response window (block 412). For non-read operations, the controller 130 returns a ReRun response during the normal Address Response window (block 414). The controller 130 then saves the tag (block 416) that was generated by the requestor for the operation, completing the analysis (block 418) for this stage of operation and forwards the operation to a non-local bus or memory.

As shown in FIG. 6b, when the controller 130 receives an indication that a remote operation has completed (block 430) the controller 130 logic proceeds to determine whether the operation was a read operation (block 432) and branches accordingly. If the operation was a read operation (block 434) then the controller 130 returns the data with the original tag. While the controller asserts the data and DTag signals the controller also asserts a signal on the DCache bus if the coherency status of the data is Shared. To indicate a null coherency status no signal is asserted on the DCache bus. As it relates to this embodiment, this completes the response (block 436) by the controller 130 for the return of a remote read operation. For the return of a remote operation which was not a read operation the controller 130 issues a ReRun request and asserts the DTag signals (block 438). Then, when the requestor reissues the non-read operation while asserting the R bit on the address bus to indicate that this is the returning operation that was rerun, the controller 130 returns the coherency response (block 440) during the normal Address Response window. Then, if the operation was a Read With Intent To Modify (block 442), the controller 130 asserts data signals for the data on the data bus 224 and asserts the tag on the DTag bus 226 (block 444), which completes the operation, from the standpoint of the present embodiment.

Figure 6C:
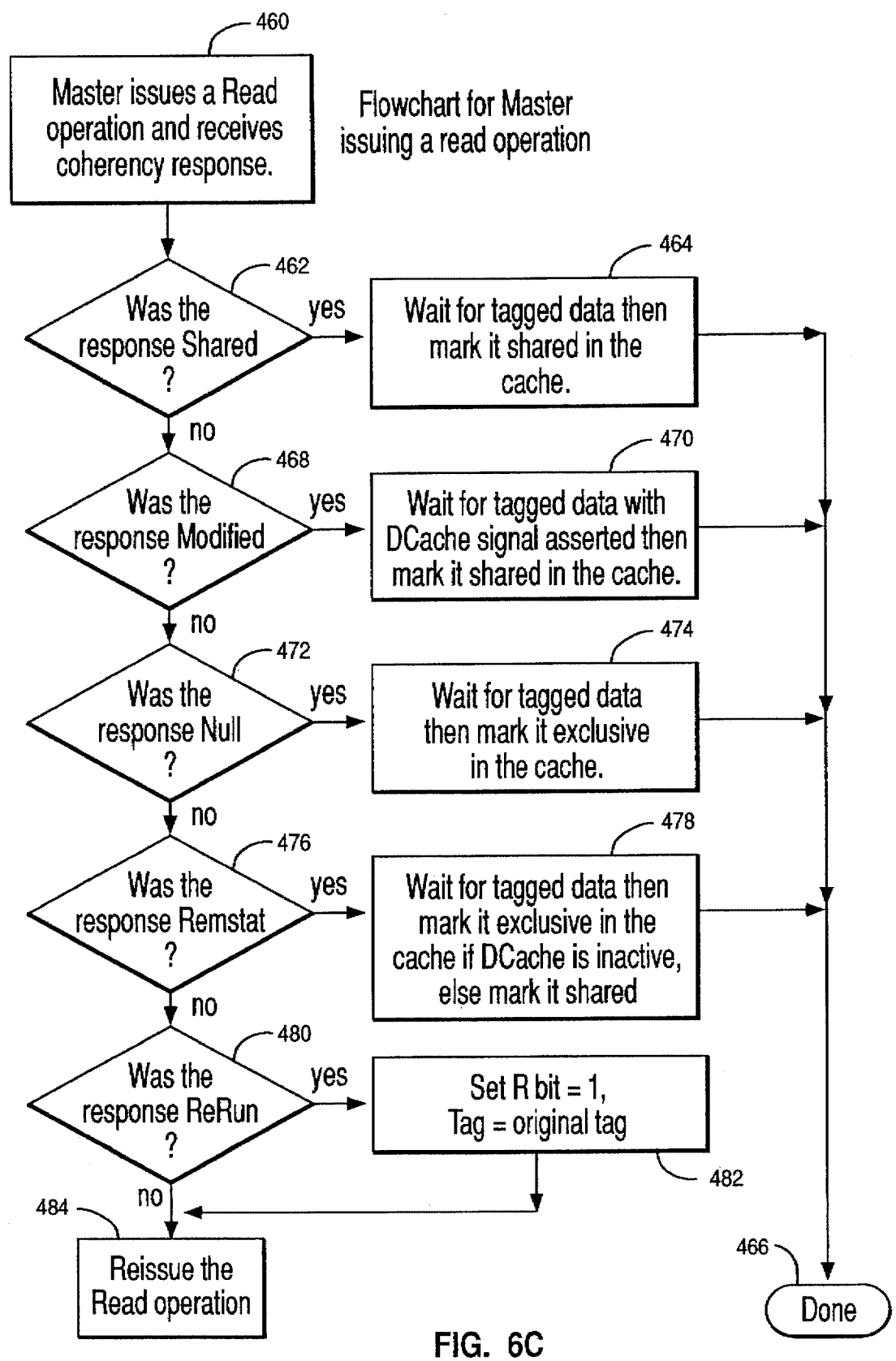

Referring now to FIG. 6c, a flow chart is shown of additional operations performed by the information processing system 100. More particularly, the flow chart of FIG. 6c shows operations performed by a master bus device such as a processor 102 of the preferred embodiment. The operations shown in FIG. 6 c may not necessarily be performed in the indicated sequence.

As indicated in block 460, the master 102 issues a read operation and receives a coherency response. The master 102 then determines the type of coherency response received. If the response indicates that the requested data has a "shared" status (block 462), this means that the data is in memory 110 on the local bus 108 and also in the cache of another processor 104, 106, etc. on the bus 108, but has not been modified in the cache. Accordingly, the master 102 waits for the data, which is tagged for the master 102, and marks the data as shared in the cache (block 464). In this case, this ends the master's processing (block 466) as it relates to the present discussion.

If the response indicates the status is "modified" (block 468), this means that the data is in memory 110 on the local bus 108 and also in the cache of another processor 104, 106, etc. on the bus 108, and has been modified in the cache. Accordingly, the master 102 waits for the tagged data (block 470). In this case a response to the read request will come from both a cache and other memory 110 and the data first received therefore depends on a race between the memory 110 and the cache. So, in order to ensure the correct data is used the master 102 waits for the cache's version of the tagged data, which is returned in connection with the DCache signal being asserted. Then the master 102 marks the data as "shared" in the cache (block 470) and is done (466) for purposes of this discussion.

If the response indicates the status is "null" (block 472), this means that the data is solely in memory 110 on the local bus 108. Accordingly, the master 102 waits for the tagged data, and then the master 102 marks the data as "exclusive" in the cache (block 474), and is done (466) for purposes of this discussion.

If the response indicates the status is "remstat" (block 476), this means the data is not in memory 110 or a cache on the local bus 108. Since this is the case, the requestor 102 will only receive a response through the processor node controller 130 and there will be no race between local memory 110 and a local cache. Therefore, the need to return a "modified" coherency status is eliminated, leaving only an "exclusive" status or "shared" status as necessary coherency responses so that the coherency response can be asserted as a digital logic signal on a single line. Accordingly, the master 102 waits for the tagged data, and if the tagged data is returned in connection with the DCache signal being asserted then the master 102 marks the data as "shared" in the cache, but otherwise marks the data as "exclusive" (block 478), and is done (466) for these purposes.

If the master 102 determines that the response does not indicate a "remstat" status, the master 102 determines whether the status is "rerun" (block 480). If so, the master 102 sets the R bit and the tag and reissues the read operation (block 482), otherwise the master 102 reissues the read operation without setting the R bit (block 484).

Although the present invention and its advantages have been described in detail, it should be understood that various changes, substitutions and alterations can be made herein without departing from the spirit and scope of the invention as defined by the appended claims.

What is claimed is:

1. In an information processing system comprising a plurality of bus devices coupled to at least one storage device via a set of buses, a method comprising the steps of:

issuing a request on a bus by a first device for data and coherency information;

monitoring for the requested coherency information during a designated coherency response interval;

sending a first signal by a second device during the designated coherency response interval indicating that the coherency information will be returned during a second interval; and sending a second signal to provide the coherency information to the first device during the second interval.

2. The method of claim 1, wherein the sending of the second signal uses fewer lines on a bus than the sending of the first signal.

3. The method of claim 2, the second interval being identified at least in part by asserting a tag and the requested data.

4. The method of claim 3, wherein the second signal is sent solely on a single line.

5. The method of claim 4, further comprising the first signal being on a first bus and the second signal being on a second bus.

6. The method of claim 1, further comprising the step of eliminating at least one possible coherency response by the second device.

7. The method of claim 6, wherein a modified coherency response is eliminated.

8. The method of claim 6, wherein a retry coherency response is eliminated.

9. The method of claim 6, wherein a rerun coherency response is eliminated.

10. The method of claim 1, further comprising the step of reducing possible coherency responses to two remaining coherency responses by the second device, and wherein the sending of the second signal further comprises sending one of the two remaining coherency responses.

11. In an information processing system comprising a plurality of bus devices coupled to at least one storage device via a set of buses, a method comprising the steps of:

issuing a bus operation by a first device coupled to a set of buses directed to at least one device not directly coupled to the set of buses, including in the bus operation a tag established by the requestor;

checking the bus operations by a second device;

issuing a first coherency response on one of the buses during a designated coherency response interval by the second device in response to a read request directed to data residing in the at least one device;

sending the read request to the at least one device;

receiving the requested data from the at least one device;

asserting the tag, the requested data and a second coherency response on one of the buses; and reading the requested data and the coherency information by the first device during a second interval.

12. The method of claim 11, wherein the step of issuing the first coherency response comprises issuing the first coherency response on a number of lines on the set of buses, and the step of asserting the second coherency response comprises asserting the second coherency response on a fewer number of lines on the set of buses.

13. The method of claim 12, further comprising the step of initiating the second interval at least in part by the second device asserting the tag and the requested data after the requested data and the coherency information are received from the at least one device .

14. An information processing system, comprising:
   a plurality of bus devices, including one or more processors;
   at least one storage device;
   a bus coupling said plurality of bus devices and said storage device;
   means for issuing a request on the bus by a first device for data and coherency information;
   means for monitoring by the first device for the coherency information during a designated coherency response interval;
   means for sending a first coherency response by a second device during the designated coherency response interval, indicating that the coherency information will be returned during a second interval; and
   means for sending a second coherency response to provide the coherency information to the first device during the second interval.

15. The system of claim 14, wherein the means for sending the first coherency response comprises means for sending the first coherency response on a number of lines of the bus, and the means for sending the second coherency response comprises means for sending the second coherency response on fewer lines of the bus than the first coherency response.

16. The system of claim 15, wherein the second interval is identified at least in part by asserting the requested data and a tag associated with the request.

17. The system of claim 16, wherein the second coherency response is communicated solely on a single line.

18. The system of claim 14, further comprising means for reducing possible coherency responses.

19. The system of claim 18, wherein the means for reducing responses eliminates a modified coherency response.

20. The system of claim 18, wherein the means for reducing responses eliminates a retry coherency response.

21. The system of claim 18, wherein the means for reducing responses eliminates a rerun coherency response.

22. The system of claim 14, wherein the means for reducing possible coherency responses comprises means for reducing the responses to two remaining second coherency responses by the second device, and wherein the means for sending the second coherency response comprises sending one of the remaining two coherency responses.

* * * * *